United States Patent [19]

Ross et al.

[11] Patent Number: 4,644,165
[45] Date of Patent: Feb. 17, 1987

[54] INTEGRATING PHOTOMETER

[75] Inventors: Malcolm G. Ross, Plymouth, Minn.; Joe T. May, Leesburg; Steven D. Hale, Lovettsville, both of Va.

[73] Assignee: Colight, Inc., Minneapolis, Minn.

[21] Appl. No.: 468,279

[22] Filed: Feb. 22, 1983

[51] Int. Cl.$^4$ .............................. G01J 1/46
[52] U.S. Cl. .................... 250/372; 356/215; 355/83
[58] Field of Search ............ 356/215, 218, 224, 226, 356/227; 355/83; 250/372

[56] References Cited

U.S. PATENT DOCUMENTS

| | | | |
|---|---|---|---|
| 3,574,443 | 4/1971 | Nanba | 356/215 |
| 3,723,000 | 3/1973 | Sone | 355/83 |
| 3,730,621 | 5/1973 | Sullivan | 355/83 |
| 3,851,970 | 12/1974 | Adler et al. | 356/218 X |
| 3,903,422 | 9/1975 | Buhrer | 250/461 |
| 3,990,799 | 11/1976 | Nanba et al. | 356/224 X |
| 4,029,966 | 6/1977 | Baker et al. | 250/372 |
| 4,143,968 | 3/1979 | Sader et al. | 355/83 |
| 4,168,124 | 5/1979 | Pizzi | 356/215 |
| 4,203,668 | 5/1980 | Chapman | 356/215 |
| 4,218,139 | 8/1980 | Sheffield | 356/218 |
| 4,227,808 | 10/1980 | Yuasa | 356/218 |
| 4,229,733 | 10/1980 | Tulenko et al. | 250/372 |
| 4,279,254 | 7/1981 | Boschetti et al. | 128/395 |
| 4,350,438 | 9/1982 | Schroter | 355/83 |
| 4,390,258 | 6/1983 | Mizokami | 356/215 |
| 4,445,773 | 5/1984 | Birkett | 355/83 X |

Primary Examiner—Vincent P. McGraw
Assistant Examiner—S. A. Turner
Attorney, Agent, or Firm—Faegre & Benson

[57] ABSTRACT

An integrating photometer for measuring total exposures to ultraviolet radiation. The circuit for the photometer includes a threshold limiter to suppress operation of the integrator until the illumination level exceeds a predetermined threshold. A power saving circuit turns the photometer off when no illumination is received during a predetermined time interval.

5 Claims, 1 Drawing Figure

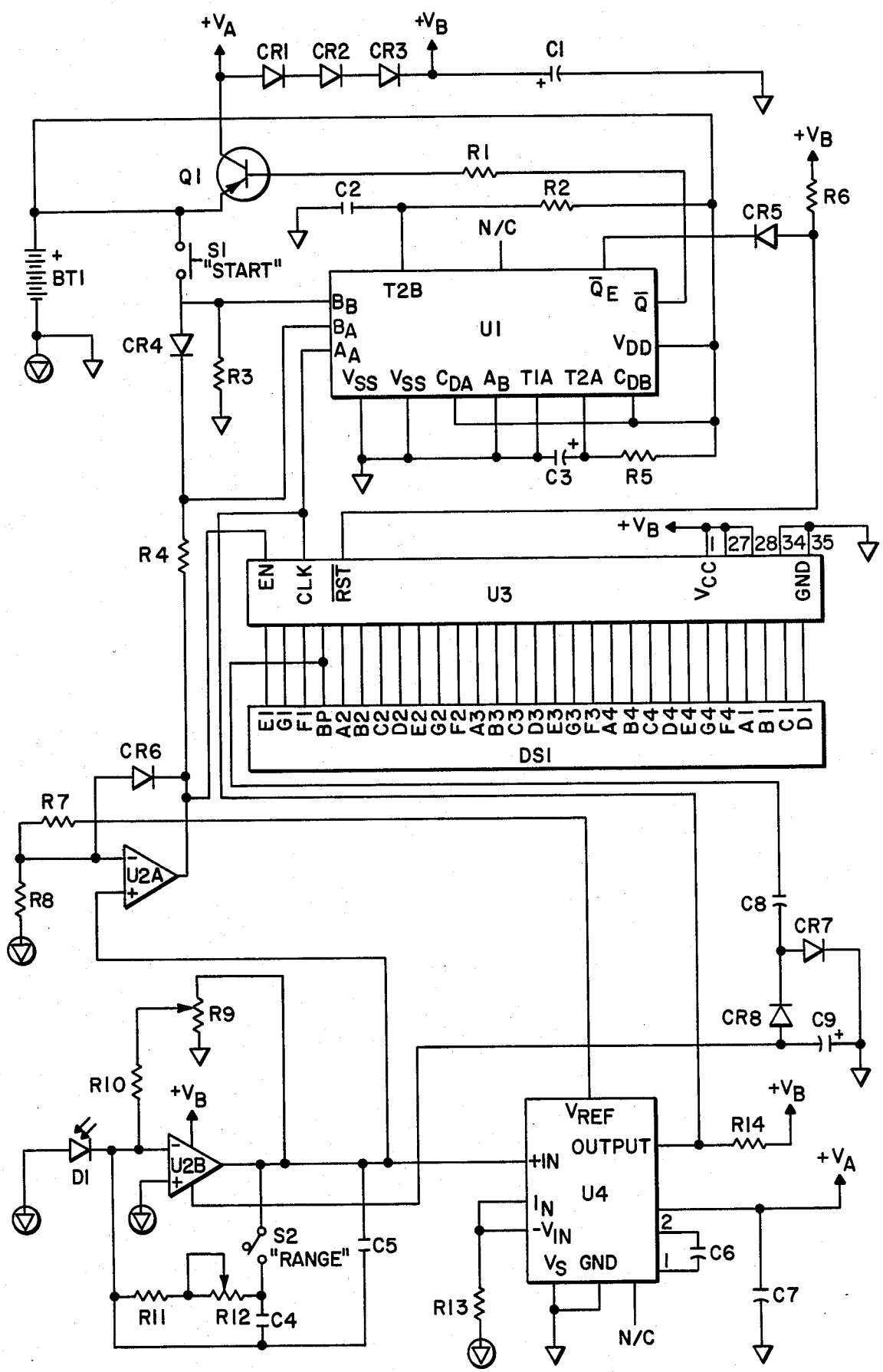

INTEGRATING PHOTOMETER

DESCRIPTION

BACKGROUND OF THE INVENTION

1. Field of the Invention

This invention relates to light measuring devices and more particularly to an integrating photometer for measuring total ultraviolet exposure over a particular time interval.

2. Description of the Prior Art

A number of photometers are available in the prior art for measuring ultraviolet and other forms of electromagnetic or light energy. Some photometers are of the integrating variety to produce an output indicative of the total amount of energy received over a particular time interval. The available integrating photometers in the prior art are relatively bulky and their use often requires manipulation of controls to achieve a reading.

In connection with the manufacture of printed circuit boards, the exposure of a board and a printed circuit master to ultraviolet light sources to expose the photo-etch material on the board creates a need for a measurement of the total amount of energy received by a particular photoetch coated board during the exposure sequence. Prior art ultraviolet photometers do not readily lend themselves to providing this sort of a measurement.

SUMMARY OF THE INVENTION

It is, therefore, an object of this invention to provide a new and improved integrating photometer for use with ultraviolet light sources.

It is a further object of this invention to provide an improved integrating means from ultraviolet light sensor which is self-contained and can be placed in a vacuum frame with printed circuit boards and masters to be exposed to provide a readily readable indication of the total amount of ultraviolet energy applied to the photo-etch material as the vacuum frame is exposed.

These and other objects of the invention are accomplished by providing a self-contained integrating photometer with a detector mounted on the photometer for providing an output signal proportional to the intensity of the electromagnetic radiation impinging upon the photometer. The output of the detector is applied to a converter for converting the output signal from the detector to an alternating current output signal having a period inversely proportional to the magnitude of the output signal of the detector. The alternating current output signal of the converter is applied to a display which provides a continuous digital output display indicating the total number of alternations undergone by the output signal of the convertor over a selected time interval.

In a further feature of this invention, means are provided for suppressing the operation of the measurement circuit when the intensity of the electromagnetic radiation impinging upon the photometer is below a predetermined threshold value. In a still further feature of the invention, timing means are provided for turning the photometer circuit off when no alternations of the output signal of the convertor occur during a predetermined time interval.

DESCRIPTION OF THE DRAWINGS

The FIGURE is a schematic drawing of the photometer circuitry.

DESCRIPTION OF THE PREFERRED EMBODIMENT

The integrating photometer electronics shown in the FIGURE is comprised of two basic portions. One is the light measuring portion and the other is the power conservation portion.

Turning first to the light measuring portion, a photodiode detector D1, having a grounded anode and a cathode connected to the inverting input of an operational amplifier, is shown. The current output of photodiode D1 is proportional to the intensity of the electromagnetic energy such as ultraviolet or visible light striking the photodiode. In the present case, the spectral response characteristics of the diode and any filter used with the diode are chosen to give the maximum response in the ultraviolet band since the preferred embodiment of the photometer is primarily intended for use with ultraviolet sources.

The current from the detector is amplified by amplifier U2B and produces an output voltage proportional to the input current and hence the input light level. The R9-R10 feedback path is a very high resistance so that the amplifier is operating almost open-loop with extremely high gain. It operates in this mode for low illumination levels. The other range of operation is selected by closing the S2 range switch to provide another feedback path through R11-R12, a much lower impedance, reducing the gain of the amplifier considerably. The capacitors C4 and C5 provide AC feedback to substantially reduce the band width of the amplifier to minimize the amplification of noise by amplifier U2B.

The voltage output of U2B is supplied to the input terminal of a voltage to frequency converter chip U4. R13 and C6 and C7 are scale factor and stabilization elements for the converter and used in accordance with the manufacturer's recommendations. The output of the voltage frequency converter at the terminal designated "Output" is a square wave whose period is inversely proportional to the input voltage. For the circuit shown, one pulse on the output is equivalent to a millijoule of light energy. The square wave is used to advance the counter commencing at zero. Each count or each complete square wave adds one digit to the digital display DSI.

In order to keep the photometer from integrating extremely low ambient ultraviolet energy levels, a threshold detector U2A is utilized. U2A compares the output of U2B to a reference voltage and when the output of U2B, representing the illumination level, exceeds a predetermined threshold, the voltage at the output of U2B exceeds the reference voltage at $V_{REF}$ of comparator U2A and produces an output voltage at the output terminal which is connected to the enable input of the display circuitry U3. When the enable input of U3 receives a high output voltage from comparator U2A indicating that the light level is above the threshold, the display is enabled to count each square wave cycle from the output pin of U4. When the illumination level is below the desired threshold representing only ambient ultraviolet light, the enable terminal EN of the display electronics receives a low signal and the counter does not record any count despite the fact that the ambient light eventually triggers some output from U4.

In order to minimize the current usage of the circuit, a power reduction arrangement is used. The built-in battery BT1 is continually connected to the supply terminal of a CMOS one-shot circuit U1. The one-shot circuit U1 is activated when the momentary contact switch S1 is closed and produces a low voltage signal on the $\overline{Q}$ output at $\overline{Q}$. The low signal on pin 7 turns on Q1 and provides the supply voltages VA and VB to the light measuring circuitry. The one-shot has timing circuitry R2 and C2 which holds the one-shot in the switched condition with the voltage at pin 7 in the low mode for approximately 45 seconds unless a retriggering pulse is received. Thus, when one operates switch S1 to turn on the circuitry, Q1 is switched on to power the rest of the circuitry for at least 45 seconds. If during that 45 second interval pulses are delivered from the output of U4 and connected to the $A_4$-input of one-shot U1, the 45 second time period is restarted. Thus, as long as 45 seconds have not elapsed from either the closing of the S1 switch or the last pulse output from the voltage to frequency converter U4, the circuitry remains under power. As soon as the threshold level of light is removed from D1 and the pulse output of U4 stops, the power is removed after 45 seconds. This greatly lengthens the life of the battery. The normal current requirement of the measuring circuitry is about 2 milliamps, while the CMOS one-shot U1 which is permanently connected to the battery requires a current only in the micro-amp range.

The unique circuit of the present invention is particularly useful in measuring the ultraviolet exposure of photoetch on printed circuit boards. The photometer is turned on by depressing S1. It measures background levels of ultraviolet energy, but does not accumulate this energy at the output display because the background levels do not trip the comparator U2A. The background count does not reset the one-shot U1, and the power to the measuring circuit remains on. The photometer is then placed in a vacuum frame with material to be exposed and is run through a contact printer. The photometer provides a direct readout of the total energy applied by the printer and turns off when the one-shot timer runs the full time and shuts off the switch Q1 when no pulses are being produced by the analog to digital circuit U4.

In some applications where the photometer is actually inserted in a contact printer with materials to be exposed, the temperature of the photometer can be expected to be substantially elevated. In order to avoid damage to the digital display element, a modified embodiment of the photometer can include all of the elements of the FIGURE with the exception of the liquid crystal display portion. After exposure of the modified embodiment of the photometer to illumination energy the contents of the counter U2 can be read out after the photometer is removed from the heat of the printer by coupling the liquid crystal to the display by means of a connector provided on the photometer case.

What is claimed is:

1. A compact, self-contained integrating ultraviolet photometer, comprising in combination:
    a case;
    a photodiode detector means mounted in said case for providing an output current directly proportional to the intensity of ultraviolet electromagnetic radiation impinging upon said photometer;
    operational amplifier and current to voltage conversion means having an input port connected to receive the output current of the photodiode detector means and constructed and arranged for presenting essentially short circuit impedance to the photodiode detector means mounted in said case for converting the output current from said photodiode detector means to an alternating current output signal having a period inversely proportional to the magnitude of said output signal of said photodiode detector means;
    threshold means coupled to receive a signal proportional to the output current of the photodiode detector means and constructed and arranged for providing an output command when the output current of the photodiode detector means is below a predetermined threshold level indicative of exposure to ambient illumination levels only; and
    display means mounted in said case and coupled to said operational amplifier and current to voltage conversion means to receive the output current therefrom and to the threshold means to receive the disable command therefrom and for providing a continuous digital output display indicating the total number of alternations undergone by the alternating output signal of the operational amplifier and current to voltage conversion means over a selected time interval only when the disable command is not received.

2. The invention of claim 1 wherein said display means includes counter means triggered by the alternating current signal from said operational amplifier and current to voltage conversion means and also included digital display means coupled to said counter means to indicate the count stored in said counter means.

3. The invention of claim 1 for use in high temperature applications wherein said display means comprises:
    counter means mounted in said case and coupled to said operational amplifier and current to voltage conversion means for receiving the output signal therefrom and storing a count there indicating the total number of alternations of the output of said operational amplifier and current to voltage conversion means; and
    visible display means arranged for connection to said photometer case and providing a visible display of the count stored in said counter means.

4. A self-contained integrating photometer according to claim 1 which also includes:
    battery means;
    switching means for coupling said battery means to said operational amplifier and current to voltage conversion means and said display means when said switching means is actuated to enable said photometer to function; and
    further switching means coupled to said switching means and said display means for disconnecting said battery means from said display means and said operational amplifier and current to voltage conversion means when a predetermined period of time has elapsed from actuation of said switching means without generation of any output signal from said operational amplifier and current to voltage conversion means.

5. The invention in claim 4 wherein said further switching means comprises a one-shot circuit which is actuated by closure of said switching means and reset by receipt of an alternating output signal from said operational amplifier and current to voltage conversion means prior to reaching the predetermined turn-off time set in said one-shot circuit.

* * * * *